(12) United States Patent
Chan et al.

(10) Patent No.: US 9,227,737 B2
(45) Date of Patent: Jan. 5, 2016

(54) HELICOPTER TUG SYSTEM

(71) Applicant: Anthony Y. Chan, Chino, CA (US)

(72) Inventors: Anthony Y. Chan, Chino, CA (US); Tracy J. Haeggstrom, Orange, CA (US); Grant D. Garfield, Folsom, CA (US)

(73) Assignee: Anthony Y. Chan, Chino, CA (US)

( * ) Notice: Subject to any disclaimer, the term of this patent is extended or adjusted under 35 U.S.C. 154(b) by 0 days.

(21) Appl. No.: 14/243,687

(22) Filed: Apr. 2, 2014

(65) Prior Publication Data

US 2014/0209733 A1 Jul. 31, 2014

Related U.S. Application Data

(63) Continuation-in-part of application No. 13/966,044, filed on Aug. 13, 2013.

(60) Provisional application No. 61/934,222, filed on Jan. 31, 2014, provisional application No. 61/853,257, filed on Apr. 2, 2013, provisional application No. 61/742,549, filed on Aug. 14, 2012.

(51) Int. Cl.
*B64F 1/10* (2006.01)
*B64F 1/22* (2006.01)

(52) U.S. Cl.
CPC .............. *B64F 1/228* (2013.01); *B64F 1/227* (2013.01)

(58) Field of Classification Search
CPC .................................. B62F 1/10; B62F 1/228
USPC .......... 180/14.7, 11, 15, 9, 9.1, 9.21, 9.3, 9.4, 180/7.1
See application file for complete search history.

(56) References Cited

U.S. PATENT DOCUMENTS

| 3,279,722 | A | * | 10/1966 | Glover, Jr. et al. | 244/50 |
|---|---|---|---|---|---|
| 3,761,040 | A | | 9/1973 | Cummins | |
| 4,033,422 | A | * | 7/1977 | Benning | 180/14.1 |
| 4,223,856 | A | * | 9/1980 | DiVincenzo | 244/50 |
| 5,151,004 | A | | 9/1992 | Johnson | |
| 5,701,966 | A | * | 12/1997 | Amico | 180/7.2 |
| 8,181,725 | B2 | | 5/2012 | Andres | |
| 8,607,905 | B2 | * | 12/2013 | Johnson | 180/11 |
| 2012/0215393 | A1 | | 8/2012 | Schiedegger | |

FOREIGN PATENT DOCUMENTS

| GB | 1382265 | | 1/1975 |
|---|---|---|---|
| WO | 2008000257 | A1 | 1/2008 |

* cited by examiner

*Primary Examiner* — Tony Winner

(57) ABSTRACT

A helicopter tug system features a helicopter with skids. A powered track assembly features a microprocessor connected to a power supply, a drive hub and an idler hub, a track located on the drive hub and the idler hub, a motor connected to the drive hub and the power supply, a receiver connected to the microprocessor, and a clamp located on a track assembly top. A caster support features a caster support frame having a wheel and the clamp located on a caster support frame top. The system features a radio control unit with a transmitter and a radio control power supply. A first powered track assembly is attached to the first helicopter skid and a first caster support is attached to the second helicopter skid. The radio control unit sends a first signal to the first track assembly to move the helicopter.

16 Claims, 9 Drawing Sheets

HELICOPTER TUG SYSTEM

CROSS REFERENCE

This application claims priority to U.S. Patent Provisional Application No. 61/853,257, filed Apr. 2, 2013, U.S. Patent Provisional Application No. 61/934,222 filed Jan. 31, 2014, U.S. Patent Non-Provisional application Ser. No. 13/966,044 filed Aug. 13, 2013, and U.S. Patent Provisional Application No. 61/742,549 filed Aug. 14, 2012, the specification(s) of which is/are incorporated herein in their entirety by reference.

FIELD OF THE INVENTION

The present invention relates to helicopter tugs, or devices used to move a helicopter without using the power of the helicopter.

BACKGROUND OF THE INVENTION

Many times, an aircraft, or more specifically, a helicopter needs to be moved into or out of a hangar or to another location but cannot reasonably be moved under its own power. A tug, or tugging device can be used to move the helicopter safely, although the tug, which in some ways may resemble a pallet jack, can be cumbersome to use. An improved tugging system is needed for moving helicopters. The present invention features a helicopter tug system for moving a helicopter without initializing the drive system of the helicopter.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a helicopter tug system for moving a helicopter without initializing the drive system of the helicopter. In some embodiments, the system comprises a helicopter having a linear first helicopter skid, and a linear second helicopter skid each horizontally located on a helicopter bottom parallel to each other.

In some embodiments, the system comprises a powered track assembly having a track assembly frame. In some embodiments, a microprocessor is located therein and operatively connected to a power supply. In some embodiments, a drive hub and an idler hub are located on a side thereon. In some embodiments, a track is located around an outside periphery of the drive hub and the idler hub. In some embodiments, a motor is operatively connected to the drive hub and the power supply. In some embodiments, a receiver is operatively connected to the microprocessor. In some embodiments, a clamp is located on a track assembly top. In some embodiments, the clamp is mated to the first helicopter skid or the second helicopter skid.

In some embodiments, the system comprises a caster support having a caster support frame. In some embodiments, the caster support frame comprises a wheel located thereon and the clamp located on a caster support frame top. In some embodiments, the clamp is mated to the first helicopter skid or the second helicopter skid.

In some embodiments, the system comprises a radio control unit having a transmitter and a radio control power supply located therein and operatively connected thereto. In some embodiments, the transmitter is in communication with the receiver. In some embodiments, a first powered track assembly is located on the first helicopter skid. In some embodiments, a first caster support is located on the second helicopter skid. In some embodiments, the radio control unit sends a first signal to the first track assembly via the transmitter communicating with the receiver to move the helicopter without initializing the drive system of the helicopter.

DESCRIPTION OF PREFERRED EMBODIMENTS

Figure 1:
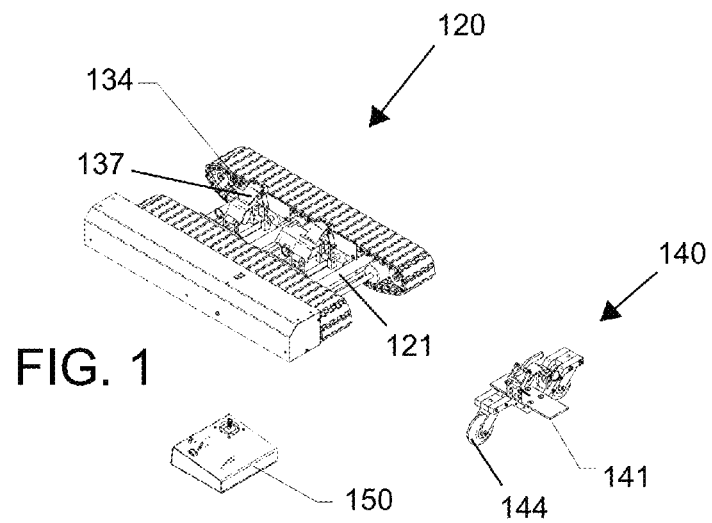
FIG. 1 shows a perspective view of the track assembly, the caster support, and the radio control unit of the present invention.
Figure 2:
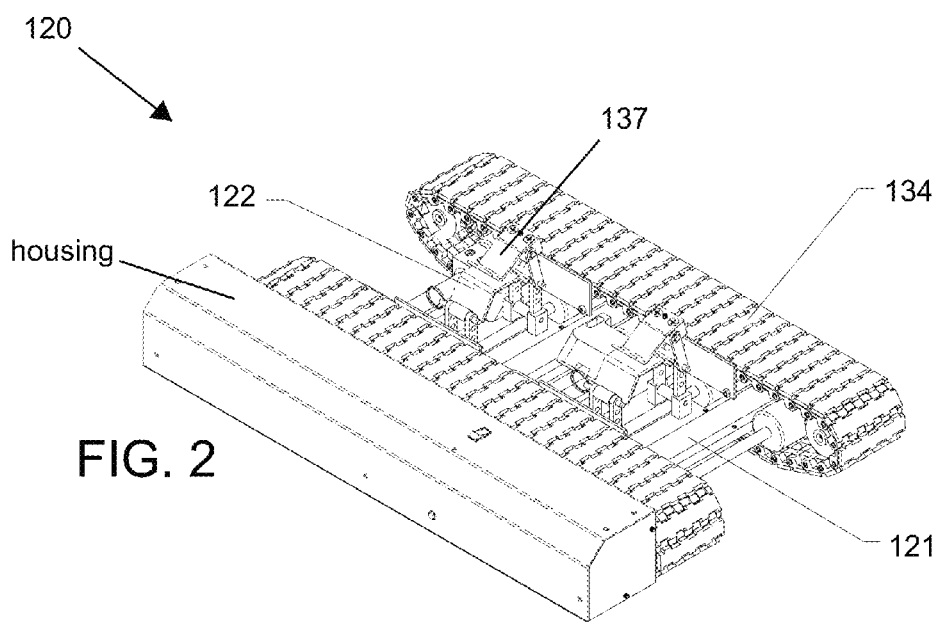
FIG. 2 shows a perspective view of the track assembly of the present invention.
Figure 3:
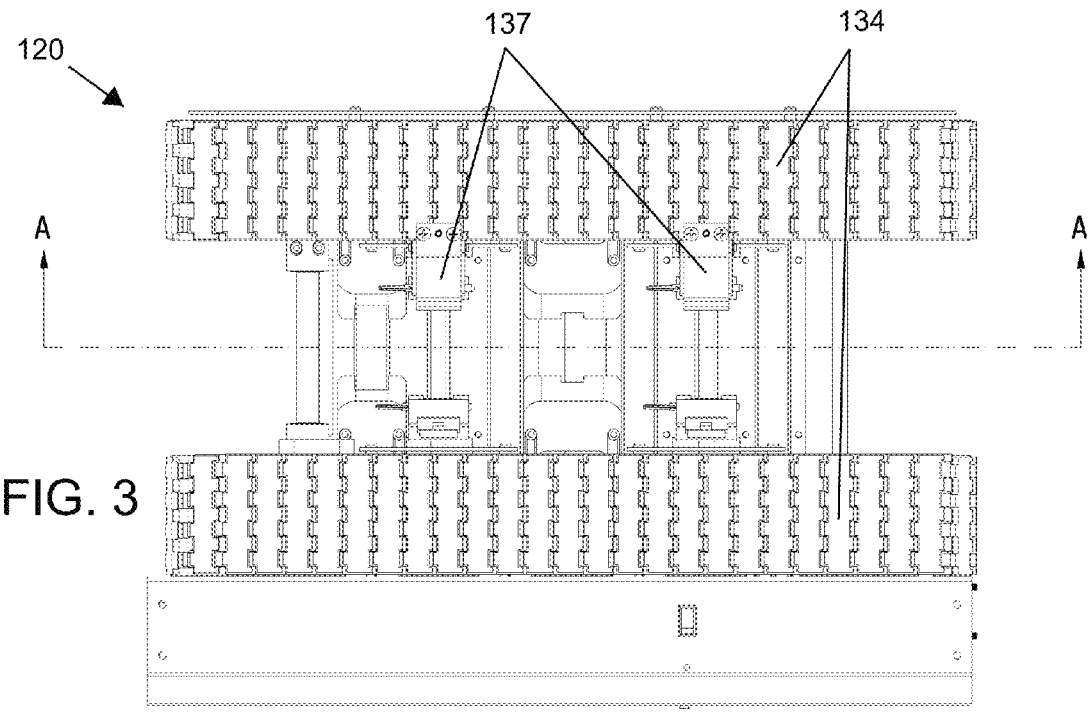
FIG. 3 shows a top view of the track assembly of the present invention.
Figure 4:
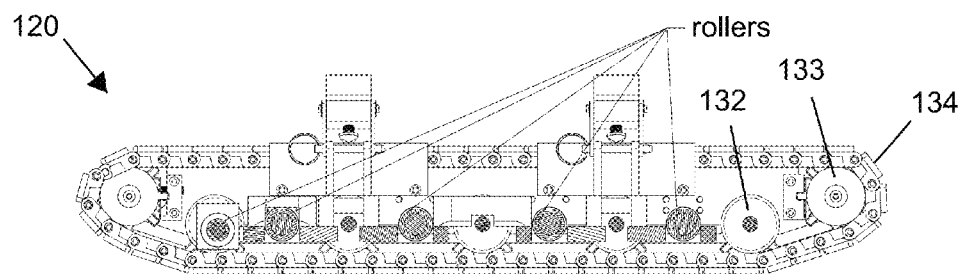
FIG. 4 shows a cross-sectional view of the track assembly of the present invention.
Figure 5:
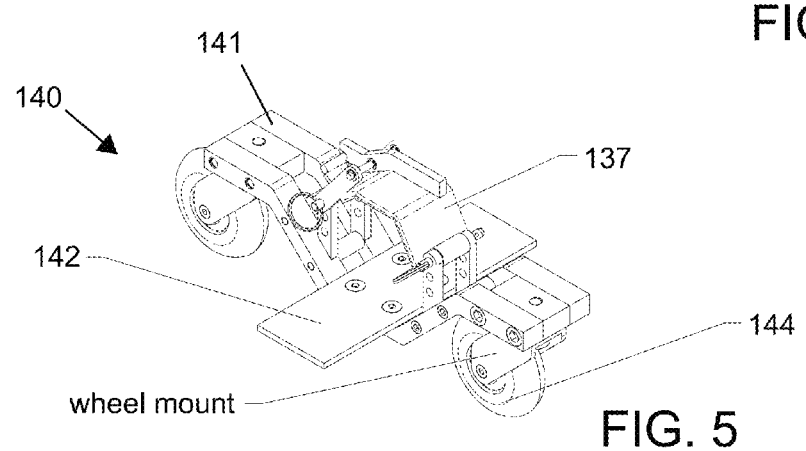
FIG. 5 shows a perspective view of the caster support of the present invention.
Figure 6:
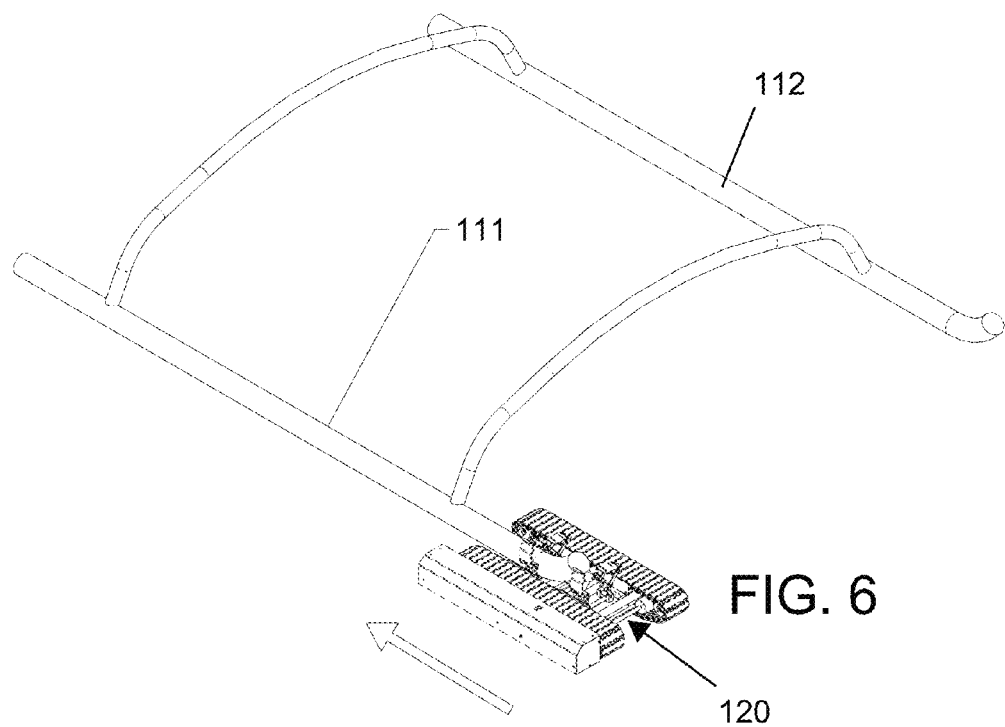
FIG. 6 shows a perspective view of the helicopter skids and the track assembly of the present invention during loading.
Figure 7:
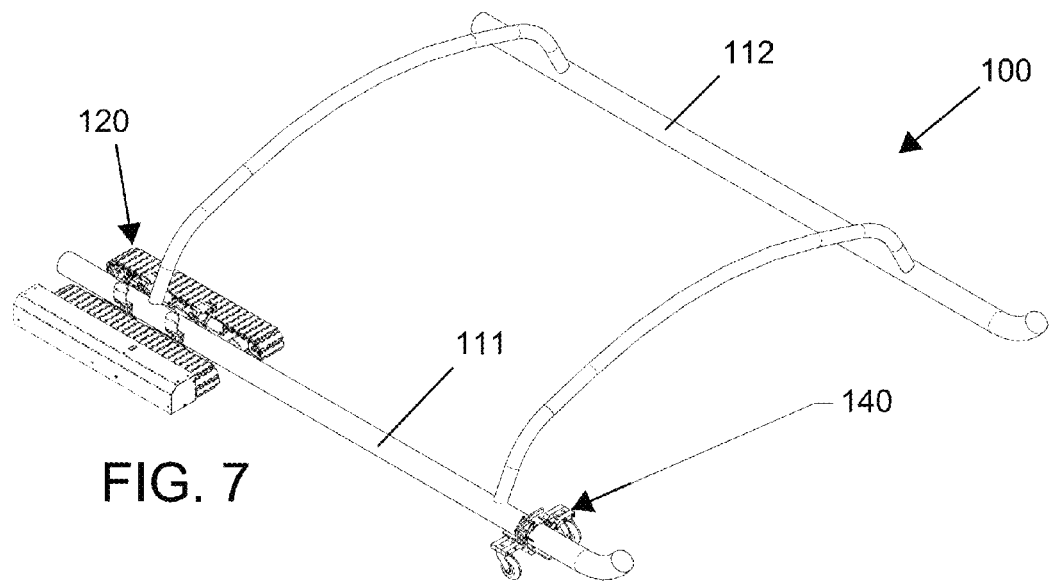
FIG. 7 shows a perspective view of the helicopter skids, the track assembly, and the caster support of the present invention.
Figure 8:
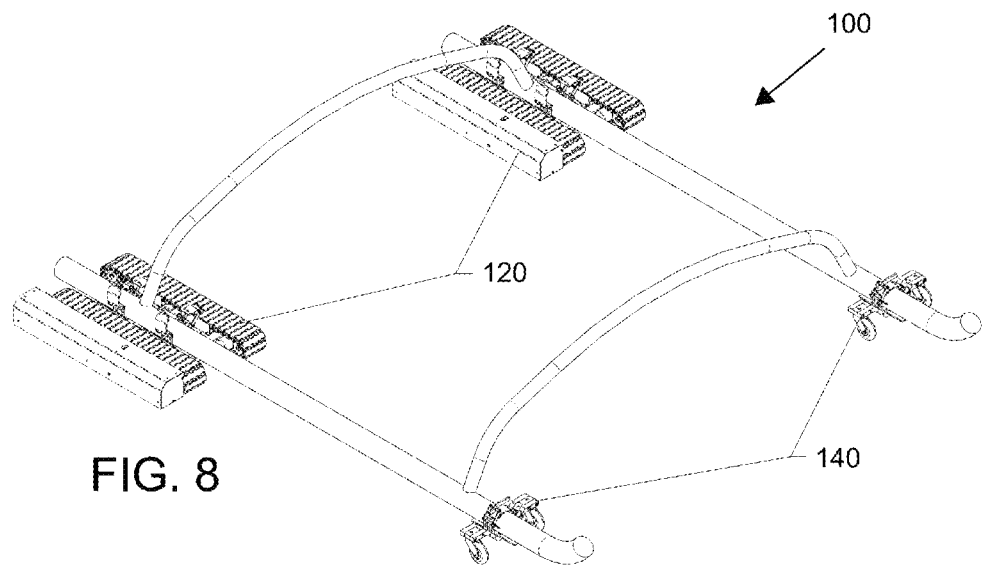
FIG. 8 shows a perspective view of an alternate embodiment of the present invention featuring the helicopter skids, two track assemblies, and two caster supports.
Figure 9:
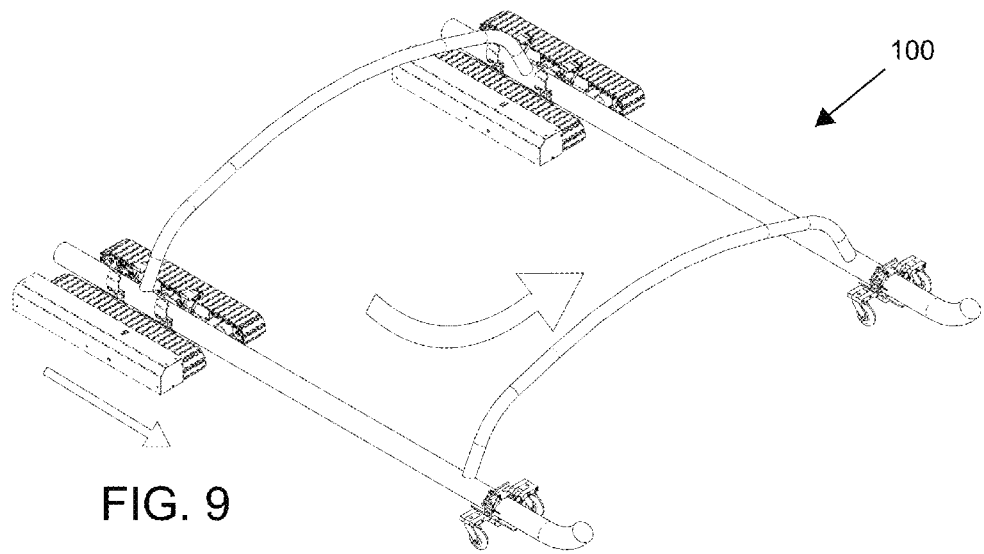
FIG. 9 shows a perspective view of an alternate embodiment of the present invention featuring the helicopter skids, two track assemblies, and two caster supports turning to the left.
Figure 10:
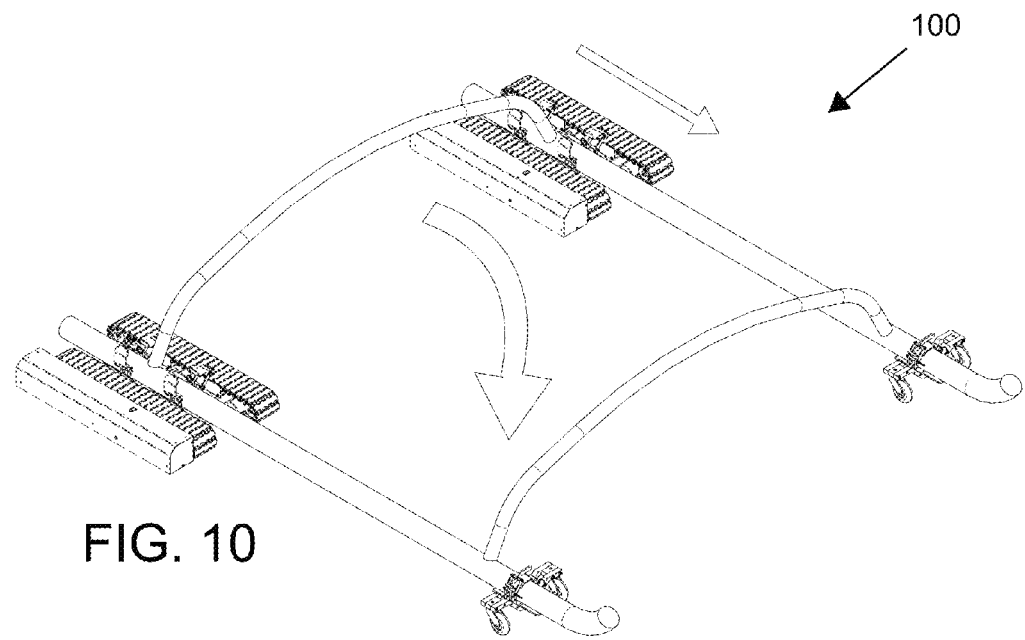
FIG. 10 shows a perspective view of an alternate embodiment of the present invention featuring the helicopter skids, two track assemblies, and two caster supports turning to the right.
Figure 11:
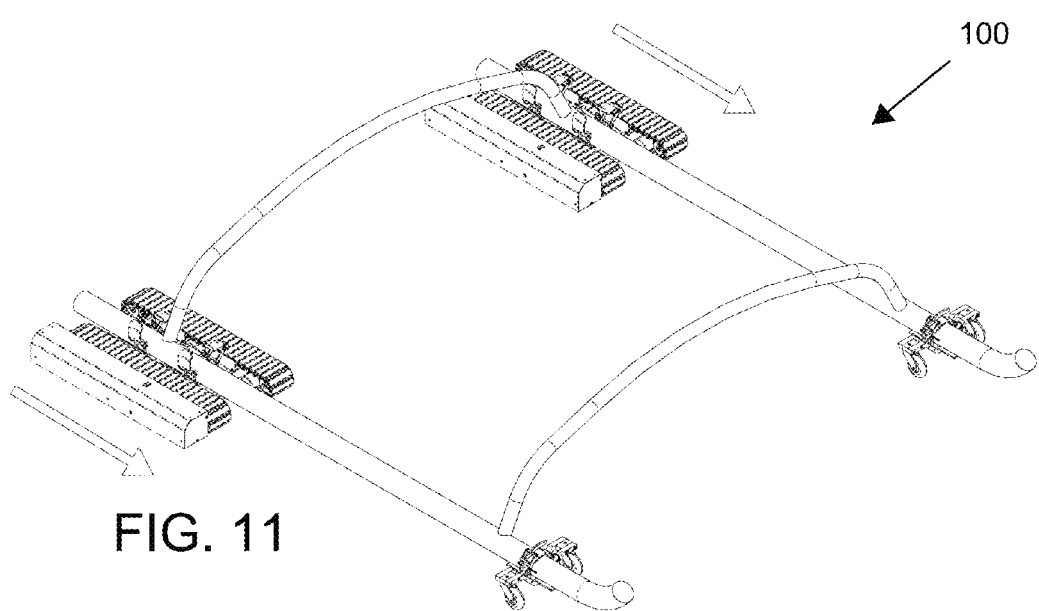
FIG. 11 shows a perspective view of an alternate embodiment of the present invention featuring the helicopter skids, two track assemblies, and two caster supports moving in a forward direction.
Figure 12:
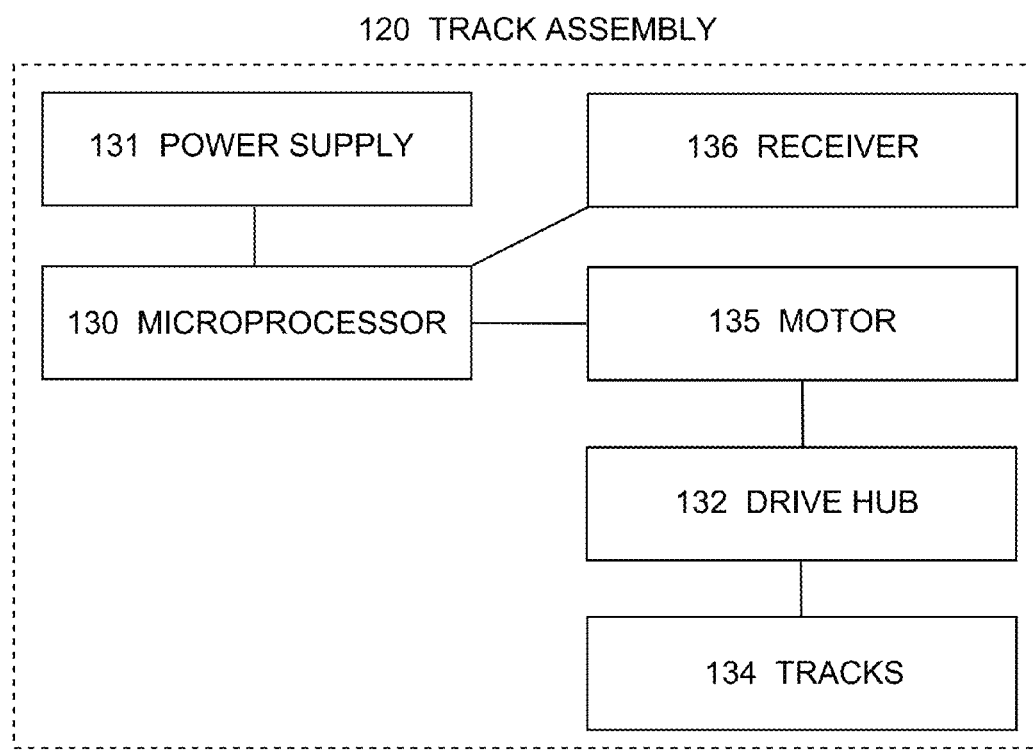
FIG. 12 shows a schematic of the track assembly of the present invention.
Figure 13:
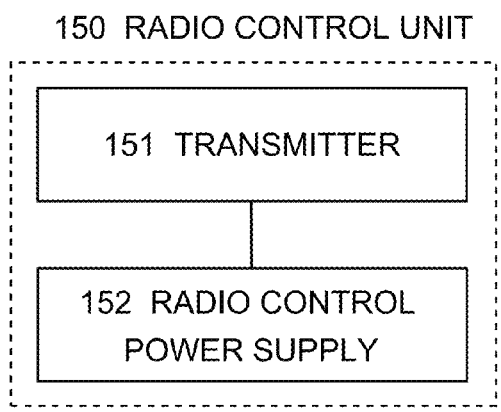
FIG. 13 shows a schematic of the radio control unit of the present invention.
Figure 14:
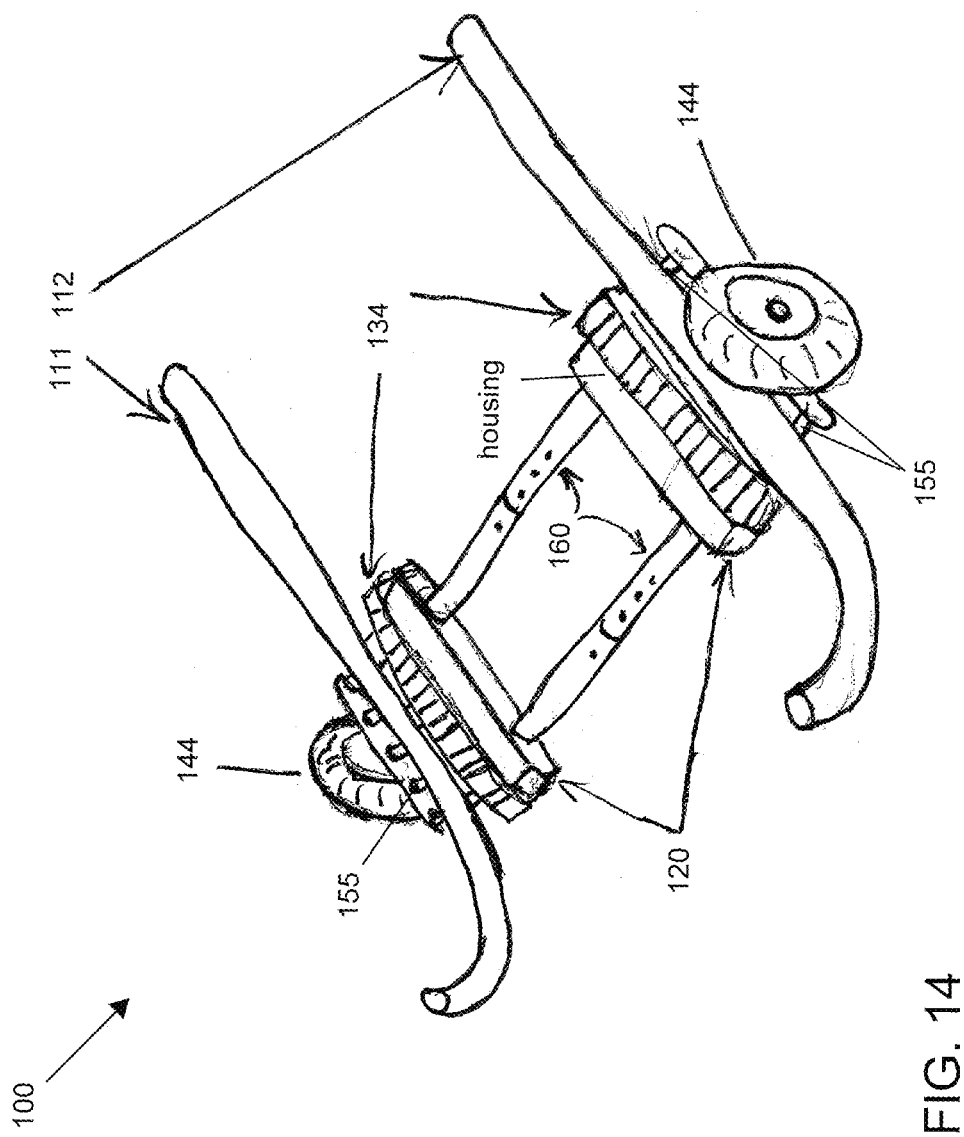
FIG. 14 shows a perspective view of an alternate embodiment of the present invention featuring the helicopter skids and two track assemblies.
Figure 15:
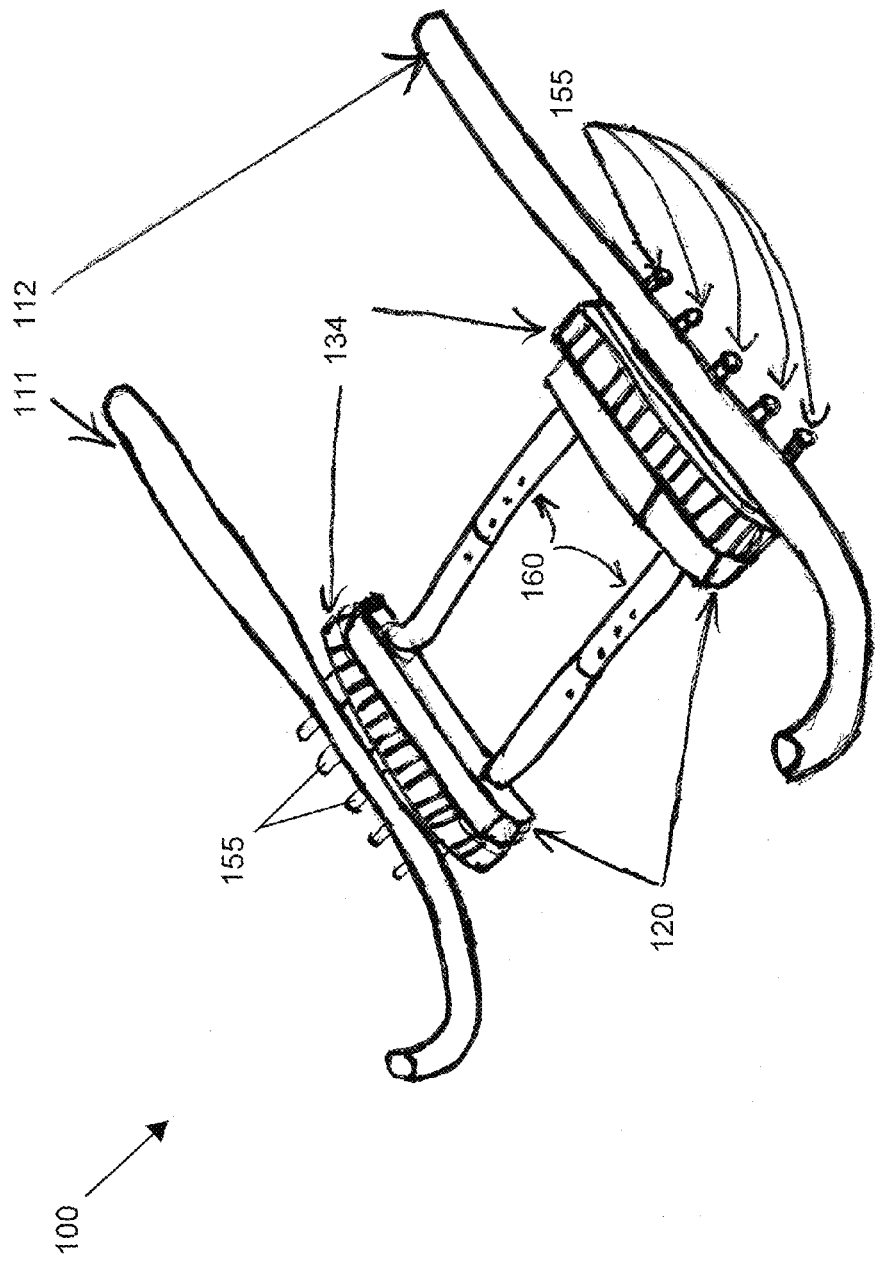
FIG. 15 shows a perspective view of an alternate embodiment of the present invention featuring the helicopter skids and two track assemblies.
Figure 16:
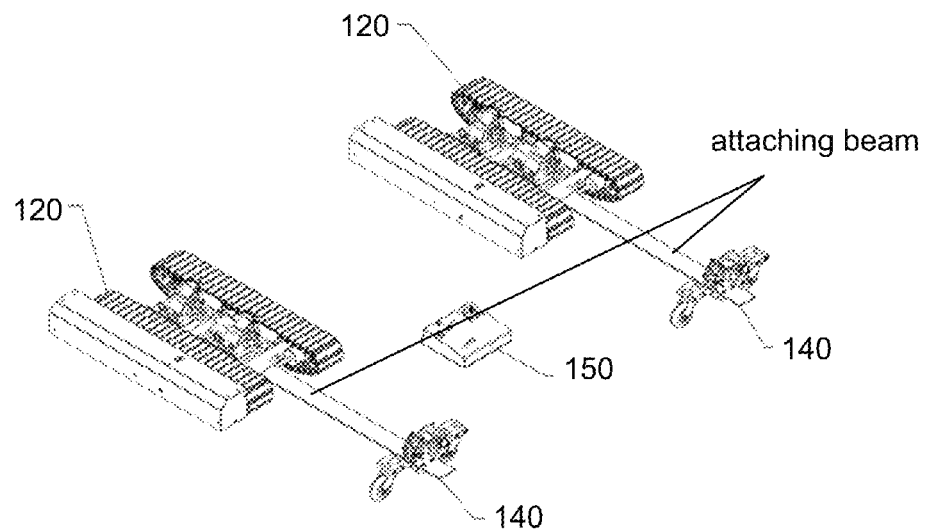
FIG. 16 shows a perspective view of an alternate embodiment of the present invention featuring two track assemblies attached to and integrated with two caster supports via two attaching beams.
Figure 17:
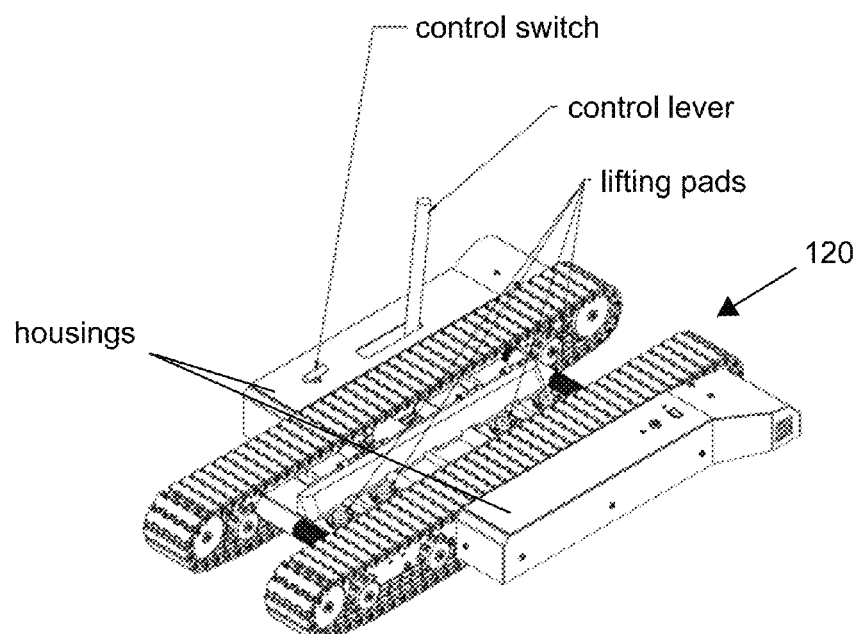
FIG. 17 shows a perspective view of an alternate embodiment of the track assembly of the present invention featuring two housings, and a lifting pad system.

Following is a list of elements corresponding to a particular element referred to herein:

100 Helicopter tug system
111 First helicopter skid
112 Second helicopter skid
120 Track assembly
121 Track assembly frame
122 Track assembly frame top
130 Microprocessor
131 Power supply
132 Drive hub
133 Idler hub
134 Tracks
135 Motor
136 Receiver
137 Clamp
140 Caster support
141 Caster support frame
142 Caster support frame top
144 Wheel
150 Radio control unit
151 Transmitter
152 Radio control power supply
155 Roller
160 Tube Referring now to FIG. 1-17, the present invention features a helicopter tug system (100) for laterally moving a helicopter without initializing the drive system of the helicopter. In some embodiments, the system (100) comprises a helicopter having a linear first helicopter skid (111), and a linear second helicopter skid (112) each horizontally located on a helicopter bottom parallel to each other.

In some embodiments, the system (100) comprises a powered track assembly (120) having a track assembly frame (121) with a track assembly frame top (122) and a track assembly frame bottom. In some embodiments, a microprocessor (130) is attached to the track assembly frame (121) and operatively connected to a power supply (131) also attached to the track assembly frame (121). In some embodiments, the system (100) comprises a housing. In some embodiments, a microprocessor (130) is located in the housing and operatively connected to a power supply (131) also located therein.

In some embodiments, a drive hub (132) and at least one idler hub (133) are rotatably located on a side of the track assembly frame (121) thereon. In some embodiments, a plurality of drive hubs (132) is rotatably located on a side of the track assembly frame (121) thereon. In some embodiments, a plurality of idler hubs (133) is rotatably located on a side of the track assembly frame (121) thereon. In some embodiments, a set of tracks (134) or treads is located around an outside periphery of the drive hub (132) and the idler hub (133). In some embodiments, a set of tracks (134) is located around an outside periphery of the drive hubs (132) and the idler hubs (133). In some embodiments, a motor (135) is operatively connected to the drive hub (132) and the power supply (131). In some embodiments, a receiver (136) is operatively connected to the microprocessor (130).

In some embodiments, a clamp (137) is located on the track assembly frame top (122). Clamps are well known to one or ordinary skill in the art. In some embodiments, the clamp (137) is mated to the first helicopter skid (111) or the second helicopter skid (112) for securely fastening thereto.

In some embodiments, one or more rollers (155) are located on the track assembly frame top (122) to aid in loading the first helicopter skid (111) or the second helicopter skid (112). In some embodiments, the track assembly (120) is able to move under the first helicopter skid (111) or the second helicopter skid (112) via the rollers (155) interfacing with the skids (111, 112) therewith. In some embodiments, the track assembly (120) is able to move via its own power under the first helicopter skid (111) or the second helicopter skid (112) via the rollers (155) interfacing therewith.

In some embodiments, one or more rollers (155) are located on the track assembly frame top (122). In some embodiments, one or more rollers (155) are parallel to one another and are located on and extend laterally (to the side) from the track assembly frame (121). In some embodiments, the first helicopter skid (111) or the second helicopter skid (112) is disposed on the roller (155) for loading.

In some embodiments, one or more rollers (155) are powered to pull the first helicopter skid (111) or the second helicopter skid (112) there upon for loading the helicopter upon the track assembly (120). In some embodiments, one or more rollers (155) comprises a roller motor and roller motor power supply operatively connected thereto for rotating the roller (155) for loading the helicopter upon the track assembly (120). In some embodiments, the rollers (155) are constructed from a rubber, a plastic, a composite, or a combination of materials to frictionally grip the first helicopter skid (111) or the second helicopter skid (112) for loading the helicopter upon the track assembly (120). In some embodiments, the rollers (155) are constructed from a metal to frictionally grip the first helicopter skid (111) or the second helicopter skid (112) for loading the helicopter upon the track assembly (120). In some embodiments, the rollers (155) are powered and controlled via the radio control unit (150). In some embodiments, the rollers (155) are locally controlled via a switch or a lever. In some embodiments, powered rollers (155) work in conjunction with the drive components of the powered track assembly (120) such as the power supply (131), the drive hub (132), and the motor (135) to pull the first helicopter skid (111) or the second helicopter skid (112) there upon for loading the helicopter upon the track assembly (120).

In some embodiments, a wheel (144) is located on the track assembly (120) opposed to the tracks (134). In some embodiments, the rollers (155) lie between the tracks (134) and the wheel (144). In some embodiments, the wheel (144) does not swivel. In some embodiments, the wheel (144) swivels.

In some embodiments, the system (100) comprises a caster support (140) having a caster support frame (141) with a caster support frame top (142) and a caster support frame bottom. In some embodiments, the caster support frame (141) comprises a wheel (144) rotatably located thereon and the clamp (137) located on the caster support frame top (142). In some embodiments, the clamp (137) is mated to the first helicopter skid (111) or the second helicopter skid (112) for securely fastening thereto.

In some embodiments, the system (100) comprises a radio control unit (150) having a transmitter (151) operatively connected to a radio control power supply (152) located therein. In some embodiments, the transmitter (151) is in communication with the receiver (136). In some embodiments, the radio control unit (150) controls a plurality of track assemblies (120) as a single unit.

In some embodiments, a first powered track assembly (120) is located on the first helicopter skid (111). In some embodiments, a first caster support (140) is located on the second helicopter skid (112). In some embodiments, the radio control unit (150) sends a first signal to the first track assembly (120) via the transmitter (151) communicating with the receiver (136) to move the helicopter without initializing the drive system of the helicopter.

In some embodiments, a second track assembly (120) is located on the helicopter second helicopter skid (112). In some embodiments, the radio control unit (150) sends a first signal to both the first track assembly (120) and the second track assembly (120) via the transmitter (151) communicating with the receiver (136) to move the helicopter without initializing the drive system of the helicopter.

In some embodiments, a plurality of track assemblies (120) is located on the first helicopter skid (111). In some embodiments, the radio control unit (150) sends a first signal to the plurality of track assemblies (120) via the transmitter (151) communicating with the receivers (136) to move the helicopter without initializing the drive system of the helicopter.

In some embodiments, a plurality of track assemblies (120) is located on the second helicopter skid (112). In some embodiments, the radio control unit (150) sends a first signal to the plurality of track assemblies (120) via the transmitter (151) communicating with the receivers (136) to move the helicopter without initializing the drive system of the helicopter.

In some embodiments, a second caster support (140) is located on the first helicopter skid (111).

In some embodiments, a plurality of caster supports is located on the first helicopter skid (111).

In some embodiments, a plurality of caster supports is located on the second helicopter skid (112).

In some embodiments, the track assembly (120) is rigidly affixed to the caster support (140) via a rigid brace or attaching beam making an integrated unit.

A preferred embodiment of the system (100) includes a first track assembly (120) and a first caster support (140) located on the first helicopter skid (111) and a second track assembly (120) and a second caster support (140) located on the second helicopter skid (112) as shown in FIGS. 8-11.

In some embodiments, the wheel (144) is located on a swivel mount. In some embodiments, the swivel mount is located on the caster support frame (141).

In some embodiments, a plurality of wheels (144) is located on the caster support frame (141).

In some embodiments, a plurality of drive motors (135) is operatively connected to a plurality of drive hubs (132) and the power supply (131).

In some embodiments, a plurality of idler hubs (133) is located on a side of the track assembly frame (121).

In some embodiments, a second track assembly (120) is placed on the helicopter second helicopter skid (112). In some embodiments, the first track assembly (120) is rigidly connected to the second track assembly (120) via a telescopically adjusting tube (160) located there between. In some embodiments, the radio control unit (150) sends a first signal to both the first track assembly (120) and the second track assembly (120) via the transmitter (151) communicating with the receiver (136) to move the helicopter without initializing the drive system of the helicopter.

For operation, each track is driven by its own motor (135) and they are connected to each other with adjustable tubes (160) between them. These can be adjusted for different size helicopters. There are rollers (155) under each skid (111, 112) that are powered and used to pull the skid (111, 112) onto the track assembly (120) as the track assembly (120) is moved forward. There would be an enclosure or a housing on each track assembly (120) that would contain the electronics and motor (135) for that track assembly (120). The two track assemblies (120) would work together as one unitary system. Both track assemblies (120) would be driven under both skids (111, 112) at the same time and then the skids (111, 112) would be lifted off of the rollers (155) with a mechanical jack so that the track assemblies (120) could be moved without the skids (111, 112) moving on the rollers (155).

In some embodiments, a lifting pad is located on the track assembly frame top (122) along with the roller(s) (155). In some embodiments, the lifting pad is controlled by the radio control unit (150). In some embodiments, the lifting pad is controlled by a local control lever or a control switch. In some embodiments a plurality of lifting pads is located on the track assembly frame top (122). In some embodiments, the lifting pad(s) elevate the first helicopter skid (111) or the second helicopter skid (112) to allow the track assembly to be positioned beneath. After the track assemblies (120) are positioned, the lifting pads are used to lift the skids (111, 112) off the rollers (155).

The invention described in this disclosure facilitates the movement of small to medium size helicopters independent of the helicopter's own power. This movement will be referred to as "tugging" in this document and the mechanism described here will be referred to as a "tug" and alternately, a track assembly (120) in this document. This track assembly (120) would be useful for but not limited to the movement of helicopters in and out of an enclosed hanger, movement of helicopters into a parking location and movement of helicopters within a garage or hanger. The illustrations shown use a mechanism to attach to the skids (111, 112) of a helicopter but the application of this invention is not limited to use with the skids (111, 112) of a helicopter.

PREFERRED EMBODIMENT

FIG. 1 shows the individual components used in the mobile component of this invention. The track assembly (120) is the component that supplies the power for moving the helicopter. The caster support (140) is used when additional support is needed on the left and/or right skids (111, 112). The radio control unit (150) is used to remotely control the track assembly (120).

A right track assembly (120) and a left track assembly (120) have equivalent functions and can be symmetrical or asymmetrical assemblies containing equal parts being assembled into a right or left configuration. Both right track assembly (120) and the left track assembly (120) will be referred to as the track assemblies (120) when there is no differentiation between them. The track assemblies (120) contain two powered tracks (134) that are connected together with connecting plates. The powered tracks (134) are driven by motors (135) that provide the movement of the track assemblies (120) during operation. There is a covered compartment that houses the electrical components of the track assemblies (120). There is one or more clamps (137) used to keep the skid (111, 112) from moving on the track assemblies (120) while moving the helicopter. There are one or more rollers (155) in the center of the track assemblies (120) that allow the skid (111, 112) to roll onto the track assembly (120) during the loading and unloading of the helicopter on the track assemblies (120).

A right caster support (140) and a left caster support (140) have equivalent functions and can be symmetrical or asymmetrical assemblies containing equal parts being assembled into right and left configurations. The caster supports (140) contain a clamp (137) and one or more caster wheels (144) and a support plate. The caster wheels (144) are mounted on a swivel fork to allow the caster wheels (144) to change direction freely.

The track assemblies are to be driven using the radio control under each helicopter skid (111, 112) and positioned to support the weight of the helicopter. Only the helicopter skid (111, 112) is shown in the figures. The skid (111, 112) is secured to the track assembly (120) using the clamp (137).

The caster support (140) can be secured to the skid (111, 112) if it is needed for additional support. This process may be repeated for both skids (111, 112) so the entire helicopter is being supported by the right and left track assemblies (120) and optional caster supports (140).

The helicopter can then be moved by operating the motors (135) in the track assemblies (120). When the right track assembly (120) is moved forward faster than the left track assembly (120) the helicopter rotates to the left. When the left track assembly (120) is moved forward faster than the right track assembly (120) then the helicopter rotates to the right. When both track assemblies (120) move forward at the same speed then the helicopter moves in a straight line. All these movements can be reversed to move the helicopter in the opposite direction.

The track assemblies (120) and optional caster supports (140) are removed from the skids (111, 112) in the reverse order from the loading sequence.

Alternately, instead of using clamps (137) to hold the skid (111, 112) on the track assembly (120) there can be one or more mechanical/electrical lift pads to raise the skid (111, 112) off of the rollers (155) to keep the skid (111, 112) from moving on the track assembly (120).

Alternately, the track assembly (120) can have two separate modes of operation. The first mode would be a "Full Control Mode" to be used when loading the track assembly (120) under the skid (111, 112). This mode uses both motors (135) independently to allow steering the track assembly (120) under the skid (111, 112). The radio control unit (150) controls only one track assembly (120) at a time in this mode. The second mode would be "Dependent Mode" to be used when both track assemblies (120) are in place and you are ready to move the helicopter. This mode makes the two motors (135) on one track assembly (120) act as a single motor (135). This allows the single radio control unit (150) to be used to control both track assemblies (120) as if they were one track assembly (120) while moving the helicopter.

The adjustable connecting tubes (160) could possibly be removed for easy transporting of the track assembly (120).

A critical feature of the present invention is the track assembly (120) can roll under the skid (111, 112) to load the helicopter on top of it. This is made possible by having the rollers (155) on the track assembly (120) that the skid (111, 112) sits on top of and they roll along as the track assembly (120) is pushed underneath it. Alternately, it uses is the powered rollers (155) to help pull the track assembly (120) under the skid (111, 112).

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A helicopter tug system (100) for moving a helicopter without initializing a drive system of the helicopter, wherein the system (100) comprises:
   (a) at least one powered track assembly (120) having a track assembly frame (121) with a track assembly frame top (122) and a track assembly frame bottom, wherein a microprocessor (130) is disposed therein and operatively connected to a power supply (131) disposed therein, wherein a drive hub (132) and at least one idler hub (133) are rotatably disposed on a side thereon, wherein a set of tracks, each track (134) is disposed around an outside periphery of the drive hub (132) and the idler hub (133), wherein a motor (135) is operatively connected to the drive hub (132) and the power supply (131), wherein a receiver (136) is operatively connected to the microprocessor (130), wherein a clamp (137) is disposed on the track assembly frame top (122), wherein the clamp (137) is mated to a first helicopter skid (111) or a second helicopter skid (112) for securely fastening thereto;
   (b) at least one caster support (140) having a caster support frame (141) with a caster support frame top (142) and a caster support frame bottom, wherein the caster support frame (141) comprises a wheel (144) rotatably disposed thereon and a second clamp (137) disposed on the caster support frame top (142), wherein the second clamp (137) is mated to the first helicopter skid (111) or the second helicopter skid (112) for securely fastening thereto; and
   (c) a radio control unit (150) having a transmitter (151) operatively connected to a radio control power supply (152) disposed therein, wherein the transmitter (151) is in communication with the receiver (136); wherein the at least one powered track assembly (120) is disposed on the first helicopter skid (111), wherein at least one caster support (140) is disposed on the first helicopter skid (111) or a second helicopter skid (112), wherein the radio control unit (150) sends a first signal to the at least one powered track assembly (120) via the transmitter (151) communicating with the receiver (136) to move the helicopter without initializing the drive system of the helicopter.

2. A helicopter tug system (100) for moving a helicopter without initializing the drive system of the helicopter, wherein the system (100) comprises:
   (a) a helicopter having a linear first helicopter skid (111), and a linear second helicopter skid (112) each horizontally disposed on a helicopter bottom parallel to each other;
   (b) at least one powered track assembly (120) having a track assembly frame (121) with a track assembly frame top (122) and a track assembly frame bottom, wherein a microprocessor (130) is disposed therein and operatively connected to a power supply (131) disposed therein, wherein a drive hub (132) and at least one idler hub (133) are rotatably disposed on a side thereon, wherein a set of tracks, each track (134) is disposed around an outside periphery of the drive hub (132) and the idler hub (133), wherein at least one motor (135) is operatively connected to the drive hub (132) and the power supply (131), wherein a receiver (136) is operatively connected to the microprocessor (130), wherein a clamp (137) is disposed on the track assembly frame top (122), wherein the clamp (137) is mated to a first helicopter skid (111) or a second helicopter skid (112) for securely fastening thereto;

(c) at least one caster support (140) having a caster support frame (141) with a caster support frame top (142) and a caster support frame bottom, wherein the caster support frame (141) comprises at least one wheel (144) rotatably disposed thereon and the clamp (137) disposed on the caster support frame top (142), wherein the clamp (137) is mated to the first helicopter skid (111) or the second helicopter skid (112) for securely fastening thereto; and (d) a radio control unit (150) having a transmitter (151) operatively connected to a radio control power supply (152) disposed therein, wherein the transmitter (151) is in communication with the receiver (136);

wherein the at least one powered track assembly (120) is disposed on the first helicopter skid (111), wherein the at least one caster support (140) is disposed on the second helicopter skid (112), wherein the radio control unit (150) sends a first signal to the first track assembly (120) via the transmitter (151) communicating with the receiver (136) to move the helicopter without initializing the drive system of the helicopter.

3. The system (100) of claim 2, wherein the at least one powered track further including a second powered track assembly (120), said track assembly is disposed on the helicopter second helicopter skid (112), wherein the radio control unit (150) sends a first signal to both track assemblies (120) via the transmitter (151) communicating with the receiver (136) to move the helicopter without initializing the drive system of the helicopter.

4. The system (100) of claim 2, wherein the at least one powered track further including plurality of powered track assemblies, said assemblies are disposed on the first helicopter skid (111), wherein the radio control unit (150) sends a first signal to the plurality of track assemblies (120) via the transmitter (151) communicating with the receivers (136) to move the helicopter without initializing the drive system of the helicopter.

5. The system (100) of claim 2, wherein the at least one powered track further including plurality of powered track assemblies, said assemblies are disposed on the second helicopter skid (112), wherein the radio control unit (150) sends a first signal to the plurality of track assemblies (120) via the transmitter (151) communicating with the receivers (136) to move the helicopter without initializing the drive system of the helicopter.

6. The system (100) of claim 2, wherein the at least one caster support further including a second caster support, said second caster support (140) is disposed on the first helicopter skid (111).

7. The system (100) of claim 2, wherein the at least one caster support further including a plurality of caster supports, said supports are disposed on the first helicopter skid (111).

8. The system (100) of claim 2, wherein the at least one caster support further including a plurality of caster supports, said supports are disposed on the second helicopter skid (112).

9. The system (100) of claim 2, wherein the at least one wheel (144) is disposed on a swivel mount, wherein the swivel mount is disposed on the caster support frame (141).

10. The system (100) of claim 2, wherein the at least one wheel further including a plurality of wheels (144), said wheel are disposed on the caster support frame (141).

11. The system (100) of claim 2, wherein the at least one motor further including a plurality of drive motors (135), said motors are operatively connected a plurality of drive hubs (132) and the power supply (131).

12. The system (100) of claim 2, wherein the at least one idler hub further including a plurality of idler hubs (133), said hubs are disposed on a side of the track assembly frame (121).

13. The system (100) of claim 2, wherein the at least one powered track assembly further including a second powered track assembly (120), said second assembly is disposed on the helicopter second helicopter skid (112), wherein the at least one powered track assembly (120) is rigidly connected to the second powered track assembly (120) via a telescopically adjusting tube (160) disposed there between, wherein the radio control unit (150) sends a first signal to both powered track assemblies (120) via the transmitter (151) communicating with the receiver (136) to move the helicopter without initializing the drive system of the helicopter.

14. The system (100) of claim 2, wherein one or more rollers (155) are located on the track assembly frame top (122), wherein the first helicopter skid (111) or the second helicopter skid (112) is disposed on the roller (155) for loading.

15. The system (100) of claim 2, wherein one or more rollers (155) are located on and extend laterally from the track assembly frame (121), wherein the first helicopter skid (111) or the second helicopter skid (112) is disposed on the roller (155) for loading.

16. The system of claim 15, wherein the at least one wheel (144) is disposed on the at least one powered track assembly (120) opposed to the tracks (134), wherein the rollers (155) lie between the tracks (134) and the at least one wheel (144).

* * * * *